United States Patent
Constant

(10) Patent No.: US 7,671,483 B2
(45) Date of Patent: Mar. 2, 2010

(54) REMOTE ISOLATOR INTERFACE

(76) Inventor: Leamon A. Constant, 62 Gold Country La., Oroville, CA (US) 05065

(*) Notice: Subject to any disclaimer, the term of this patent is extended or adjusted under 35 U.S.C. 154(b) by 230 days.

(21) Appl. No.: 11/702,879

(22) Filed: Feb. 5, 2007

(65) Prior Publication Data
US 2007/0182249 A1     Aug. 9, 2007

Related U.S. Application Data

(60) Provisional application No. 60/765,376, filed on Feb. 6, 2006.

(51) Int. Cl.
*B60L 1/00* (2006.01)
(52) U.S. Cl. .................................................. 307/9.1
(58) Field of Classification Search ................. 307/9.1
See application file for complete search history.

(56) References Cited

U.S. PATENT DOCUMENTS

| | | | |
|---|---|---|---|
| 3,721,887 A | 3/1973 | Nickerson | |
| 3,893,697 A | 7/1975 | Blitz | |
| 4,071,915 A | 2/1978 | Kurataro | |
| 4,088,940 A | 5/1978 | Ciarniello | |
| 4,137,557 A | 1/1979 | Ciarniello | |
| 4,218,717 A | 8/1980 | Shuster | |
| 4,237,385 A | 12/1980 | Jurgens | |
| 4,493,001 A | 1/1985 | Sheldrake | |
| 4,902,956 A | 2/1990 | Sloan | |
| 4,926,332 A | 5/1990 | Komuro | |
| 5,128,551 A | 7/1992 | Clokie | |
| 5,136,230 A * | 8/1992 | Gayler | 320/127 |
| 5,180,275 A | 1/1993 | Czech | |
| 5,228,538 A | 7/1993 | Tremblay | |
| 5,321,389 A | 6/1994 | Meister | |
| 6,091,340 A * | 7/2000 | Lee et al. | 340/5.6 |
| 6,424,511 B1 | 7/2002 | Levinas | |

* cited by examiner

*Primary Examiner*—Robeert L. Deberadinis
(74) *Attorney, Agent, or Firm*—Eric Hanscom; Todd Langford

(57) ABSTRACT

A remote isolator interface uses a vehicle's OEM remote (or aftermarket remote door lock) entry signal to interface between the battery and aftermarket electrical equipment, electronically separating the OEM systems/battery from aftermarket systems such that a short or power spike in the aftermarket system does not damage the OEM system. The invention also shuts off power to the aftermarket systems when the vehicle doors are locked by OEM remote entry or electric door locks, and can be combined with a magnetic battery disconnect to allow electrical current to reach the aftermarket systems when the doors are unlocked. The invention can also be combined with a fused distribution panel to become a single source of power for any aftermarket equipment, thereby eliminating the need for an installer to cut into the OEM systems for a power source and thereby void the manufacturer's warranty.

18 Claims, 2 Drawing Sheets

REMOTE ISOLATOR INTERFACE

CROSS REFERENCE TO RELATED APPLICATIONS

This application claims priority from U.S. Provisional App. No. 60/765,376 filed Feb. 6, 2006.

STATEMENT REGARDING FEDERALLY SPONSORED RESEARCH OR DEVELOPMENT

This invention was not federally sponsored.

BACKGROUND OF THE INVENTION

1. Field of the Invention

This invention relates to the general field of electronic signal disruption devices, and more specifically, to a remote isolator interface which uses a vehicle's OEM remote (or aftermarket remote door lock) entry signal to interface between the vehicle's battery/OEM electrical system and aftermarket electrical equipment in a variety of ways. In combination with a magnetic battery disconnect the invention electronically separates the OEM electrical systems—including the vehicle's battery—from aftermarket systems such that if the aftermarket system has a short or power spike, it does not damage the OEM system. It also shuts off power to the aftermarket systems when the OEM remote entry locks the doors of the vehicle, or if the vehicle's electric door locks are used to lock the vehicle doors, such that the battery is not drained by the aftermarket systems once the car is shut off. The invention allows electrical current to reach the aftermarket systems when the OEM remote entry unlocks the vehicle doors or if the vehicles' electric door locks are used to unlock the vehicle. A final aspect of the invention is it can be combined with a fused distribution panel to become a single source of power for any aftermarket equipment, thereby eliminating the need for an installer to cut into the OEM systems for a power source.

2. History of the Invention

Vehicle batteries are designed to retain adequate charge to start a car even after supporting the OEM systems for several weeks. Thus, when a businessperson leaves his or her car in an airport parking lot for a month, he or she expects it to start right upon turning the ignition key. Starting with the first installation of aftermarket electrical accessories, such as stereos with memory, mobility lifts and equipment, GPS systems, and many other current drawing items, there has been a need to separate the additional aftermarket equipment from the OEM electrical system when not in use.

While some of these aftermarket accessories drew little current, some, like mobility lifts with interlocks, draw a considerable amount of current. Under normal conditions, this presents few problems as the vehicle's alternator recharges the battery as the car is driven. When the car is turned off, theoretically only the original OEM equipment should draw power from the battery, but realistically, some of the aftermarket accessories also draw power after the car is turned off, thereby decreasing the amount of time before the battery loses enough power so that it fails to start the vehicle. Many vehicles today lock the doors through a remote control device, normally one attached to the keys and small enough to put in a pocket. With these vehicles, the OEM electrical system is designed to draw only a miniscule amount of current once the remote control device has locked the doors, however, aftermarket accessories can draw on the battery in these vehicles as well.

As the number of aftermarket systems began to multiply, it became common for a vehicle to contain more than one, and many times multiple systems that require a constant current draw, there was a concurrent rise in the rate at which a vehicle's battery was drained. Indeed, the attachment of several significantly drawing electrical aftermarket accessories can drain a normal battery in a matter of days. Since many vehicle owners leave their cars and trucks parked for more than several days at a time without running them, there has been an undesirable rise in the numbers of dead batteries for such users.

Thus, human technology and innovation in the creation of attractive aftermarket accessories created a problem—the shortened time span before a battery in a vehicle will lose so much charge that it can not start a vehicle—which this invention addresses. To solve this problem, a device had to be invented which could serve as a switch, or interface, between a vehicle's battery, the OEM electrical systems which needed to continue drawing a minimal amount of current to continue functioning while the car was "off", and the aftermarket accessories which were draining the battery while the vehicle was "off".

3. Prior Art

The prior art has several examples of attempts to use an electrical signal or device to protect one set of electrical devices from another, but none of the prior art addresses the problem of how to protect a vehicle's OEM electrical system, including the battery, from electrical spikes, shorts, and general drainage due to aftermarket accessories, nor does the prior art teach the use of a remote control device to automatically activate and inactivate such a system.

For example, U.S. Pat. No. 3,893,697 to Blitz, et. al, U.S. Pat. No. 4,051,915 to Behrens, U.S. Pat. No. 4,218,717 to Shuster, U.S. Pat. No. 4,493,001 to Sheldrake, U.S. Pat. No. 4,902,956 to Sloan, U.S. Pat. No. 4,237,385 to Jurgens, et. al., U.S. Pat. No. 4,926,332 to Komuro, et. al., U.S. Pat. No. 5,128,551 to Clokie, U.S. Pat. No. 5,136,230 to Gayler, U.S. Pat. No. 5,228,538 to Tremblay, and U.S. Pat. No. 5,321,389 to Meister provide vehicle-related electrical protection or safety devices, but none address the issue of protecting a vehicle's battery from being damaged by spikes or shorts in aftermarket systems, or being drained by the aftermarket systems. Others, such as U.S. Pat. No. 3,721,887 to Nickerson, U.S. Pat. Nos. 4,088,940 and 4,137,557 to Ciarniello, and U.S. Pat. No. 4,237,385 to Jurgens, et. al., teach various approaches to providing protection circuits in general electrical applications, but fail to answer the question of how to protect a vehicle's battery and OEM electrical system from spikes and shorts, as well as how to prevent a vehicle's battery from being drained during the time a car is turned off. Finally, there are non-vehicle machines, such as that illustrated by U.S. Pat. No. 5,180,275 to Czech, et. al., which utilize lockout switches, but do no teach the electrical circuitry features as illustrated by the current patent.

A patent which addresses disconnecting a vehicle's battery is U.S. Pat. No. 6,424,511 to Levinas. This invention automatically disconnects the battery when certain conditions exist, for example and in particular, when the battery voltage reaches a specified low level. Thus, when a battery has been drained to a certain point where there is likelihood that further drainage will endanger the ability of the battery to start the vehicle, the battery is automatically disconnected. While this invention serves as a solid "band aid" measure to prevent a vehicle's battery which has already been drained to a dangerously low lever from being drained further, it does not prevent the exact situation from occurring which this invention will prevent nor can it separate the aftermarket systems' drainage from the regular OEM systems' drain on the battery. Thus, after starting the engine, a user will have to reset all of the OEM equipment (such as clocks and digital odometer readings) which have been inactivated by the disconnection of the battery.

Another issue which has not been addressed by the prior art is how to disconnect a battery from one or more systems without cutting into the factory-installed wiring systems. A major reason to avoid such actions are that with most systems "crashing the dash" or cutting into the existing wiring system as it voids the manufacture's warranty.

THE INVENTION

Thus there has existed a long-felt need for a means to separate the vehicle's battery and OEM electrical systems from the aftermarket accessories, such that the aftermarket accessories do not unnecessarily drain the battery while the vehicle has been turned off. The current invention provides just such a solution by providing a remote isolator interface which uses a remote controlled device which controls a non-critical component of a vehicle's OEM electrical system, preferably the vehicle's OEM remote entry signal, to interface between the vehicle's battery and aftermarket electrical equipment in a variety of beneficial ways. First, the invention electronically separates the OEM—including the vehicle's battery—and aftermarket systems such that if the aftermarket system has a short or power spike, it does not damage the OEM system. It also shuts off power to the aftermarket systems when the OEM remote entry locks the doors of the vehicle, or if the vehicle's electric door locks are used to lock the vehicle doors. Finally, the invention can be combined with a magnetic battery disconnect to allow electrical current to reach the aftermarket systems when the OEM remote entry unlocks the vehicle doors or if the vehicles' electric door locks are used to unlock the vehicle. For purposes of illustration, the best mode of the invention—the door lock electrical system and the remote control device which activates it—will be used, but it is contemplated that a variety of non-critical electrical components of the OEM electrical system can be used to accomplish the same goal.

The invention functions as a "switch" in between the battery disconnect and aftermarket equipment. Using the power door lock remote as a trigger, the invention electronically disconnects the aftermarket equipment from the battery and OEM electrical systems whenever the doors are locked. Thus, while the car is parked, the aftermarket equipment is turned off and cannot draw on the battery, and any electrical problems associated with the aftermarket equipment will not reach the battery and OEM electrical systems. When the doors are unlocked, the invention reconnects the aftermarket accessories to the OEM electrical system so that they can function when the vehicle is operating. This allows for the use of less expensive interlocks for mobility equipment than were possible to use before the innovation and unique method of use taught by the remote isolator interface.

By relying on a simple "tie-in" with a non-critical aspect of the OEM electrical system—the electronic door lock for example—the invention performs all of the functions taught by the prior, provides additional inventive aspects, and does so without cutting into the factory OEM system such that the vehicle's original warranty will be voided. As opposed to the prior art, this invention relies on multiplexing wires and, in industrial terms, acts "after the battery" such that the use of this invention does not void a vehicle's warranty.

A final advantage that the device brings to the owner of a vehicle is that should the vehicle be found to be drawing an undesirable amount of current, the invention allows a mechanic or engine diagnostic technician to more quickly diagnose whether the current draw is coming from the OEM or aftermarket equipment. By merely pressing the remote door lock device while measuring current draw, the person testing the vehicle's electrical system can easily determine where the undesirable current draw is emanating from by "disconnecting" the aftermarket accessories while performing the test.

SUMMARY OF THE INVENTION

It is a principal object of the invention to provide a device which can interface with a vehicle's aftermarket systems and its OEM systems.

It is another object of the invention to provide such an interface that can work with any brand of vehicle containing any brand of aftermarket systems.

It is an additional object of the invention to provide such an interface that can interface between a vehicle's OEM systems and more than one aftermarket system.

It is a further object of the invention that the invention will allow the use of less expensive interlocks.

An additional aspect of the invention is to provide a means of isolating electrical current to a vehicle's battery by means of using one or more multiplexing wires.

A further aspect of the invention is to allow a user of the invention control over battery drainage and connecting or disconnecting aftermarket systems from the battery through means which do not involve opening the vehicle's dashboard to tie into the OEM electrical system.

It is another aspect of the invention to provide a solution to the problem of battery drainage through the power draw of aftermarket systems which does not void the manufacturer's warranty.

Another aspect of the invention is to provide a means to electronically isolate aftermarket accessories from a vehicle's battery through an electrical tie-in with a non-critical component of the vehicle's OEM electrical system, preferable, the vehicle's electronic door locks.

It is also an object of this invention to allow a mechanic or engine diagnostic technician to more quickly diagnose whether the current draw is coming from the OEM or aftermarket equipment by using the remote door lock to connect and disconnect the aftermarket accessories from the OEM electrical system and the battery by merely "beeping" the doors locks open and closed and viewing the results on various diagnostic equipment.

It is a final object of this invention to provide a means of temporarily and easily disconnecting the aftermarket accessories from the vehicle's battery and OEM electrical system which is both easy to use and affordable, particularly when compared with the risk and cost of a dead battery.

It should be understood that while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

DETAILED DESCRIPTION OF THE FIGURES

Figure 1:
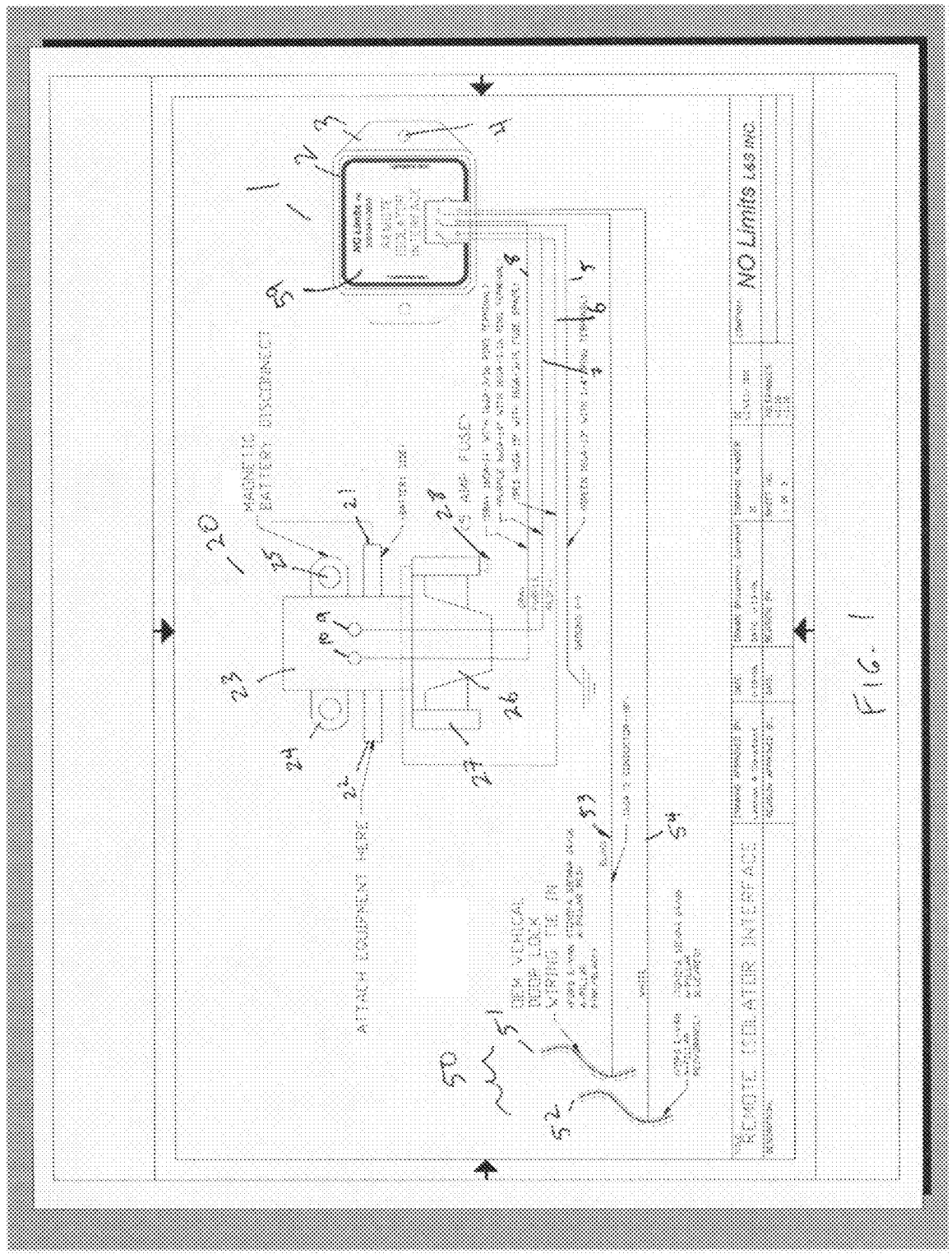
FIG. 1 is a schematic of the remote isolator interface as electrically connected in between a magnetic battery disconnect and the OEM vehicle door lock wiring.

FIG. 1 is a schematic of the remote isolator interface as electrically connected in between a magnetic battery disconnect and the OEM vehicle door lock wiring. The invention, a remote isolator interface, generally indicated by reference number 1, consists of a body portion (2) with a screw-on cover (59) with plug-in access opening, which houses the circuit boards and other electrical components of the invention, and a base portion (3) which has one or more holes (4) through which the invention can be attached to the vehicle body by bolts, screws, rivets, or other similar means of attachment. The invention is powered on and off through its tie in with door lock wires (generally referred to by reference number 50) from the OEM vehicle electric door lock. When the remote electronic door lock is triggered by a user, the flow of electricity through the positive (52) and negative (51) wires is altered. This sends an electrical signal through the black wire (53), which is tied into the negative wire (51) from the OEM vehicle door lock, and the white wire (54), which is tied into the positive wire (52) from the OEM vehicle door lock. The altered flow of energy thereby reaches the invention, or remote isolator interface, (1) through the white (54) and black (53) wires. The white and black wires are, preferably, 16 gauge, two wire jacketed conductor.

Emanating from the remote isolator interface (1) are, in addition to the aforementioned and discussed white wire (54) and black wire (53), several other wires. A green wire (5), preferably 16GA, with a ¼" ring terminal (not shown in this figure but well known in the art as a convenient open circle which allows the ground wire to be bolted to a source of ground) connects to a source of ground. A red wire (6) connects to the fuse holder (27) which houses the fuse (28), and is electrically connected to the fuse (28) through the fuse holder (27). A purple wire (7), preferably 18GA with a 18GA-³⁄₁₆ ring terminal (9) at its end for easy attachment, is connected the electrical system in a magnetic battery disconnect (generally referred to by 20). A gray wire (8), preferably 18GA with a 18GA-³⁄₁₆ ring terminal (9) at its end for easy attachment, is connected the electrical system in the magnetic battery disconnect (20).

Figure 2:
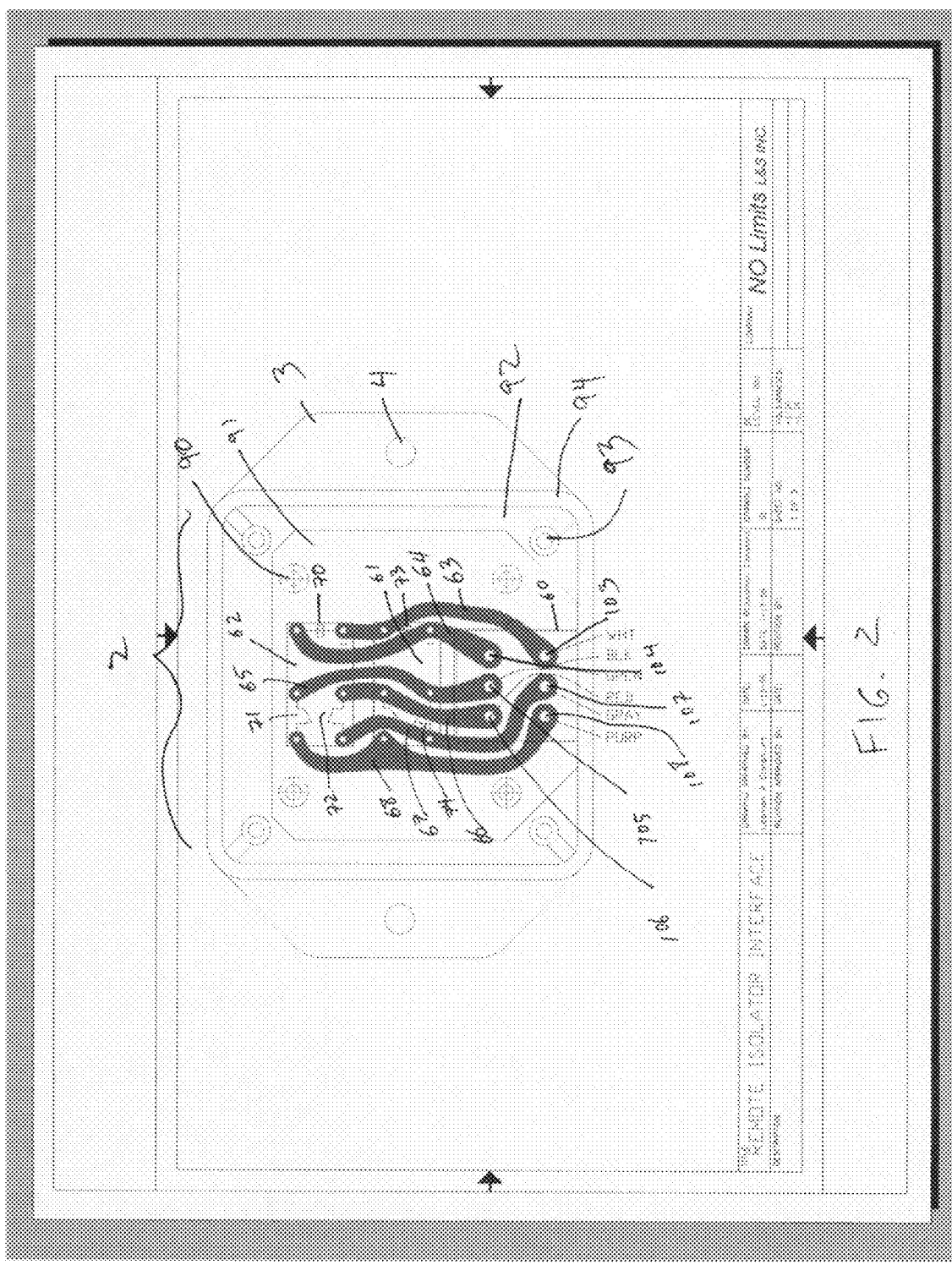
FIG. 2 is a schematic top view of the remote isolator interface showing the circuit board and receptacles for the various wires.

Through electrical connections and means discussed more thoroughly under FIG. 2, and that known in the art which is not a claimed portion of this invention but rather well known electrical components which function in well known ways to accomplish to goal of this invention, the altered electrical current from the OEM door lock remote control device then causes electrical changes in the magnetic battery disconnect, generally referred to be reference number 20. The magnetic battery disconnect (20) comprises several parts. There is a mounting bracket (24) which one or more holes (25) through which the magnetic battery disconnect (20) can be attached to the vehicle body by bolts, screws, rivets, or other similar means of attachment. There is a fuse holder (26) which contains side fuse pods (27) into which a fuse (28) can be inserted. The fuse is removably inserted through the use of springs, clips, or other means of insertion well know in the art. The magnetic battery disconnect (20) also has a circuit housing structure (23) which is a square or rectangular-shaped enclosure attached to the mounting bracket (24) which houses the circuit boards and other electrical components of the magnetic battery disconnect (20). Projecting off one side of the circuit housing structure is a battery terminal (21) which connects the magnetic battery disconnect (20) to the vehicle's battery. On the other side is an aftermarket equipment terminal (22) to which all of the aftermarket equipment installed in the vehicle is electrically connected.

As the user of the vehicle locks or unlocks the door locks with the remote, the change in electrical current—a polarity reversing signal—from the door lock wires (50) is transmitted through the black wire (53) and white wire (54) where it creates an electrical reaction in the remote isolator interface (1) which is relayed through the purple wire (7) and the gray wire (8) to the circuit housing structure (23), where the electrical connection between the battery (connected to the battery terminal 21) and the aftermarket equipment (connected to the aftermarket terminal 22) can be established when the door locks are unlocked, and severed when the door locks are locked. Within the circuit housing structure (23) is a power disconnect which isolates the aftermarket electrical systems such that they never merge with the OEM electrical systems. For safety, the green line (5) establishes a constant connection to a source of ground and the red wire (6) is connected to one or more fuses (28) in case there is a short or spike in electrical current.

FIG. 2 is a schematic top view of the remote isolator interface showing the circuit board and receptacles for the various wires.

Body portion (2) comprises a low profile enclosure (94), preferably made from plastic, with mounting bosses (93). There are three pads (60, 61, and 62) laying upon a PC board (91) to which the various connectors can be connected to establish electrical connections through pins to the pad. Preferably, PC board (91) is a PC Board Mount MATE-N-LOK 6 pin. Connectors are generally raised above the pad and are connected to the pads through "pins", or points of contact similar to small pop rivets that not only connect the connector to the pad, but also provide the necessary elevation to the connection such that it doesn't connect to all the pads automatically by lying on top of each, but also gives adequate space for disconnect switches, circuit breakers, and other electrical devices to be inserted and attached between the connectors and pads at various locations. The pads are designed to leave a small enough footprint such that all three can fit within the body portion (2 in FIG. 1).

The white connector (63) has a receptacle (103) for the white wire (54 in FIG. 1) that goes to the positive door lock wire (52 in FIG. 1). The white connector (63) is pinned to pads 60, 61, and 62, connected to the black connector (64) on pad 61 through a circuit breaker (73), and connected to the black connector (64) on pad 62 by a circuit breaker (70). The black connector (64) has a receptacle (104) for the black wire (53 in FIG. 1) that goes to the negative door lock wire (51 in FIG. 1). The black connector (64) is pinned to pads 60, 61, and 62. The green connector (65) has a receptacle (105) for the green wire (5 in FIG. 1) that goes to the source of ground. The green connector (65) is pinned to pads 60, 61, and 62, and connected by a disconnect switch (71) to the purple connector (68) in pad 62. The red connector (66) has a receptacle (105) for the red wire (6 in FIG. 1) that goes to fuse hold (27 in FIG. 1) and fuse (28 in FIG. 1). The red connector (66) is pinned to pads 60, 61, and 62, and connected by a disconnect switch (72) to the gray connector (67) in pad 62), and to the gray connector (67) in pad 61. The gray connector (67) has a receptacle (107) for the gray wire (8 in FIG. 1) that goes to the magnetic battery disconnect (20 in FIG. 1). The gray connector (67) is pinned to pads 60, 61, and 62. The purple connector (68) has a receptacle (108) for the purple wire (7 in FIG. 1) that goes to the magnetic battery disconnect (20 in FIG. 1). The purple connector (68) is pinned to pads 60, 61, and 62.

The various connectors are attached to each other through a wide variety of disconnect switches, circuit breakers, and other electrical components which allow the invention to perform its various operations.

One or more through-holes (90) allow the pad bench to be connected to the base (92) of the body portion.

What I claim is:

1. A device for interfacing between a battery/OEM electrical system of a vehicle and the vehicle's aftermarket accessories, comprising: a remote isolator interface and a magnetic battery disconnect, where the remote isolator interface additionally comprises a ground wire and is electronically connect to a wiring tie in to an OEM vehicle door lock system, and where, when the OEM vehicle door lock system is turned off by a user of the invention, a polarity reversing signal from the OEM vehicle door lock system is created, which reaches the remote isolator interface, and where the remote isolator interface then creates an electrical signal to the magnetic battery disconnect, where the electrical signal causes the magnetic battery disconnect to sever any electrical connections between the vehicle's battery/OEM electrical system and the vehicle's aftermarket electrical systems, thereby preventing, when the vehicle is turned off, a spike and a short in the aftermarket electrical system from affecting the vehicle's battery/OEM electrical system, and preventing a drain on the battery from the aftermarket electrical systems.

2. The device of claim 1, where, the remote isolator interface comprises a body portion, where the body portion comprises a screw-on cover with a plug-in access opening, one or more circuit boards, a base portion which comprises a flat foot portion extending laterally from the body portion and one or more holes through which the invention can be attached to the vehicle body by bolts, screws, rivets, or other similar means of attachment, a low-profile enclosure with one of more mounting bosses, a PC board with one or more through-holes which allow the PC board to be attached to the body portion, and where the PC board contains two or more pads and two or more connectors, where the two or more connectors are attached at least one location to one or more of the two or more pads by means of one or more pins, and where the two or more connectors are electrically linked to each other by at least one circuit breaker and at least one disconnect switch, and where the at least two or more connectors each have a receptacle into which a wire can be attached.

3. The device of claim 2, where the number of pads is three.

4. The device of claim 3, where the number of connectors is six.

5. The device of claim 2, where the number of pads is three, and the PC Board is a PC Board Mount MATE-N-LOK 6 pin or similar pad.

6. The device of claim 2, where the number of pads is three and the number of connectors is six, where each connector has a corresponding wire attached to it, and one wire goes to a source of ground, one wire goes to a fuse pod which contains a fuse, two wires go to a magnetic battery disconnect, and two wires go to two wires of the wiring tie in to an OEM vehicle door lock system.

7. The device of claim 1, where the magnetic battery disconnect additionally comprises a battery terminal, an aftermarket equipment terminal, a battery disconnect, a circuit housing structure, a mounting bracket with one or more holes, a fuse holder, one or more fuse pods, and one or more fuses, where the battery disconnect is housed in the circuit housing structure and the battery disconnect is connected by two or more wires to the remote isolator interface, and attached to the circuit housing structure is the fuse holder, which has attached to it the one or more fuse pods, and where each fuse pod can contain a fuse, and where fuse can be easily inserted or removed by means of snaps, springs or other means, and where the mounting bracket extends laterally from the sides of the circuit housing structure, and where the mounting bracket has one or more holes through which the magnetic battery disconnect can be attached to the vehicle by means of screws, bolts, rivets or other means of attachment, and where the battery terminal may receive an electrical connection with a battery, and where the aftermarket equipment terminal may receive an electrical connect with one or more items of aftermarket equipment which has been installed in the vehicle, and where the battery disconnect has the ability to sever any electrical connection between the battery and the aftermarket equipment.

8. The device of claim 7, where the battery disconnect is connected to two wires which are also connected to the remote isolator interface, and where, when the door locks to the vehicle are locked, a polarity reversing signal is generated, and the remote isolator interface sends an electrical signal through the two wires which are also connected to the remove isolator interface which cause the battery disconnect to sever any electrical connection between the battery and the aftermarket equipment.

9. The device of claim 8, where the device additionally comprises two wires between the remote isolator interface and the magnetic battery disconnect, and where the two wires are 18 Gauge.

10. The device of claim 9, where, the remote isolator interface comprises a body portion, where the body portion comprises a screw-on cover with a plug-in access opening, one or more circuit boards, a base portion which comprises a flat foot portion extending laterally from the body portion and one or more holes through which the invention can be attached to the vehicle body by bolts, screws, rivets, or other similar means of attachment, a low-profile enclosure with one of more mounting bosses, a PC board with one or more through-holes which allow the PC board to be attached to the body portion, and where the PC board contains two or more pads and two or more connectors, where the two or more connectors are attached at least one location to one or more of the two or more pads by means of one or more pins, and where the two or more connectors are electrically linked to each other by at least one circuit breaker and at least one disconnect switch, and where the at least two or more connectors each have a receptacle into which a wire can be attached.

11. The device of claim 10, where the remote isolator interface contains three pads and six connectors, where each connector has a corresponding wire attached to it.

12. The device of claim 11, where one connector goes to a source of ground, one connector goes to a fuse pod which contains a fuse, two connectors go to a magnetic battery disconnect, and two wires go to two wires of the wiring tie in to an OEM vehicle door lock system.

13. The device of claim 7, where the remote isolator interface comprises a body portion, where the body portion comprises a screw-on cover with a plug-in access opening, one or more circuit boards, a base portion which comprises a flat foot portion extending laterally from the body portion and one or more holes through which the invention can be attached to the vehicle body by bolts, screws, rivets, or other similar means of attachment, a low-profile enclosure with one of more mounting bosses, a PC board with one or more through-holes which allow the PC board to be attached to the body portion, and where the PC board contains two or more pads and two or more connectors, where the two or more connectors are attached at least one location to one or more of the two or more pads by means of one or more pins, and where the two or more connectors are electrically linked to each other by at least one circuit breaker and at least one disconnect switch, and where the at least two or more connectors each have a receptacle into which a wire can be attached.

14. A device for interfacing between a battery and OEM electrical system of a vehicle and the vehicle's aftermarket accessories, comprising: a remote isolator interface and a magnetic battery disconnect, where the remote isolator interface additionally comprises a ground wire and is electronically connect to a wiring tie in to a non-critical component of the OEM electrical system, where the non-critical component of the OEM electrical system has a remote control device, and where, when the remove control device is triggered by a user of the invention, an electrical connected between the battery and OEM electrical system of a vehicle and the vehicle's aftermarket accessories can be selectively connected and disconnected where the non-critical component is the electronic OEM vehicle door lock system, and where a polarity reversing signal from the OEM vehicle door lock system is created, which reaches the remote isolator interface, and where the remote isolator interface then creates an electrical signal to the magnetic battery disconnect, where the electrical signal causes the magnetic battery disconnect to sever any electrical connections between the vehicle's battery and OEM electrical system, and the vehicle's aftermarket electrical systems, thereby preventing, when the vehicle is turned off, a spike and a short in the aftermarket electrical system from affecting the vehicle's battery and OEM electrical system, and preventing a drain on the battery from the aftermarket electrical systems.

15. A method of interfacing between a battery and OEM electrical system and a vehicle and the vehicle's aftermarket accessories, comprising the steps of: first, obtaining a remote isolator interface, where the remote isolator interface comprises a remote isolator interface and a magnetic battery disconnect, where the remote isolator interface additionally comprises a ground wire and is electronically connect to a wiring tie in to a non-critical component of the OEM electrical system, where the non-critical component of the OEM electrical system has a remote control device, and where, when the remove control device is triggered by a user of the invention, an electrical connected between the battery and OEM electrical system of a vehicle and the vehicle's aftermarket accessories can be selectively connected and disconnected, second, installing the remote isolator interface to a non-critical component of a vehicle's OEM electrical system, third, using a remote control device to activate and deactivate the non-critical component of the vehicle's OEM electrical system to cause all electrical connections between the aftermarket accessories and the vehicle's battery/OEM electrical system to terminate such that the aftermarket accessories do not put a drain on the battery and such that any spikes or shorts in the aftermarket accessories are not transmitted to the vehicle's battery/OEM electrical system where the non-critical component is the electronic OEM vehicle door lock system, and where a polarity reversing signal from the OEM vehicle door lock system is created, which reaches the remote isolator interface, and where the remote isolator interface then creates an electrical signal to the magnetic battery disconnect, where the electrical signal causes the magnetic battery disconnect to sever any electrical connections between the vehicle's battery and OEM electrical system, and the vehicle's aftermarket electrical systems, thereby preventing, when the vehicle is turned off, a spike and a short in the aftermarket electrical system from affecting the vehicle's battery and OEM electrical system, and preventing a drain on the battery from the aftermarket electrical systems.

16. The method of claim 15, where the remote isolator interface additionally comprises a body portion, where the body portion comprises a screw-on cover with a plug-in access opening, one or more circuit boards, a base portion which comprises a flat foot portion extending laterally from the body portion and one or more holes through which the invention can be attached to the vehicle body by bolts, screws, rivets, or other similar means of attachment, a low-profile enclosure with one of more mounting bosses, a PC board with one or more through-holes which allow the PC board to be attached to the body portion, and where the PC board contains two or more pads and two or more connectors, where the two or more connectors are attached at least one location to one or more of the two or more pads by means of one or more pins, and where the two or more connectors are electrically linked to each other by at least one circuit breaker and at least one disconnect switch, and where the at least two or more connectors each have a receptacle into which a wire can be attached.

17. The method of claim 16, where the where the magnetic battery disconnect additionally comprises a battery terminal, an aftermarket equipment terminal, a battery disconnect, a circuit housing structure, a mounting bracket with one or more holes, a fuse holder, one or more fuse pods, and one or more fuses, where the battery disconnect is housed in the circuit housing structure and the battery disconnect is connected by two or more wires to the remote isolator interface, and attached to the circuit housing structure is the fuse holder, which has attached to it the one or more fuse pods, and where each fuse pod can contain a fuse, and where fuse can be easily inserted or removed by means of snaps, springs or other means, and where the mounting bracket extends laterally from the sides of the circuit housing structure, and where the mounting bracket has one or more holes through which the magnetic battery disconnect can be attached to the vehicle by means of screws, bolts, rivets or other means of attachment, and where the battery terminal may receive an electrical connection with a battery, and where the aftermarket equipment terminal may receive an electrical connect with one or more items of aftermarket equipment which has been installed in the vehicle, and where the battery disconnect has the ability to sever any electrical connection between the battery and the aftermarket equipment.

18. The method of claim 17, where the number of pads is three and the number of connectors is 6, where each connector has a corresponding wire attached to it, and one wire goes to a source of ground, one wire goes to a fuse pod which contains a fuse, two wires go to a magnetic battery disconnect, and two wires go to two wires of the wiring tie in to an OEM vehicle door lock system.

* * * * *